Feb. 28, 1939.   J. R. REYBURN   2,148,503
ANTISKID CHAIN MAKING MACHINE
Filed Dec. 1, 1936   2 Sheets-Sheet 2
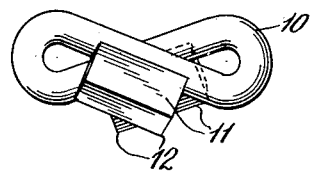
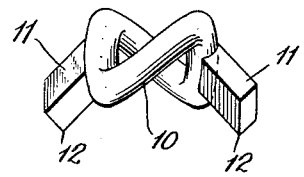
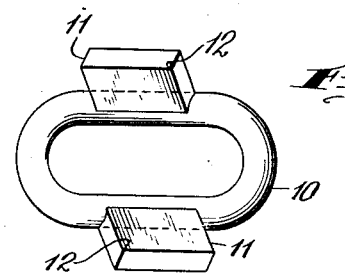
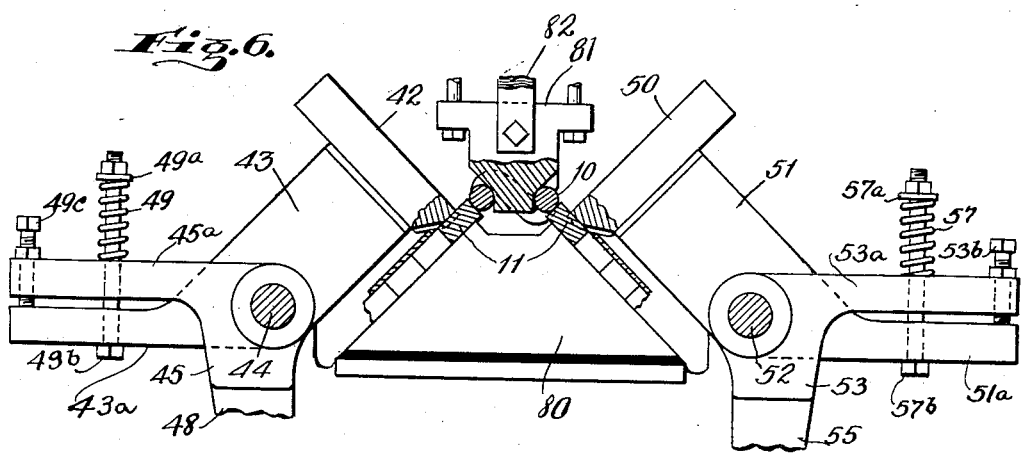
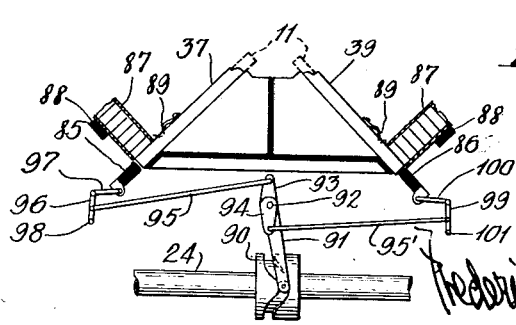
INVENTOR
JOHN R. REYBURN
BY
Frederick P. Duncan
ATTORNEY Patented Feb. 28, 1939

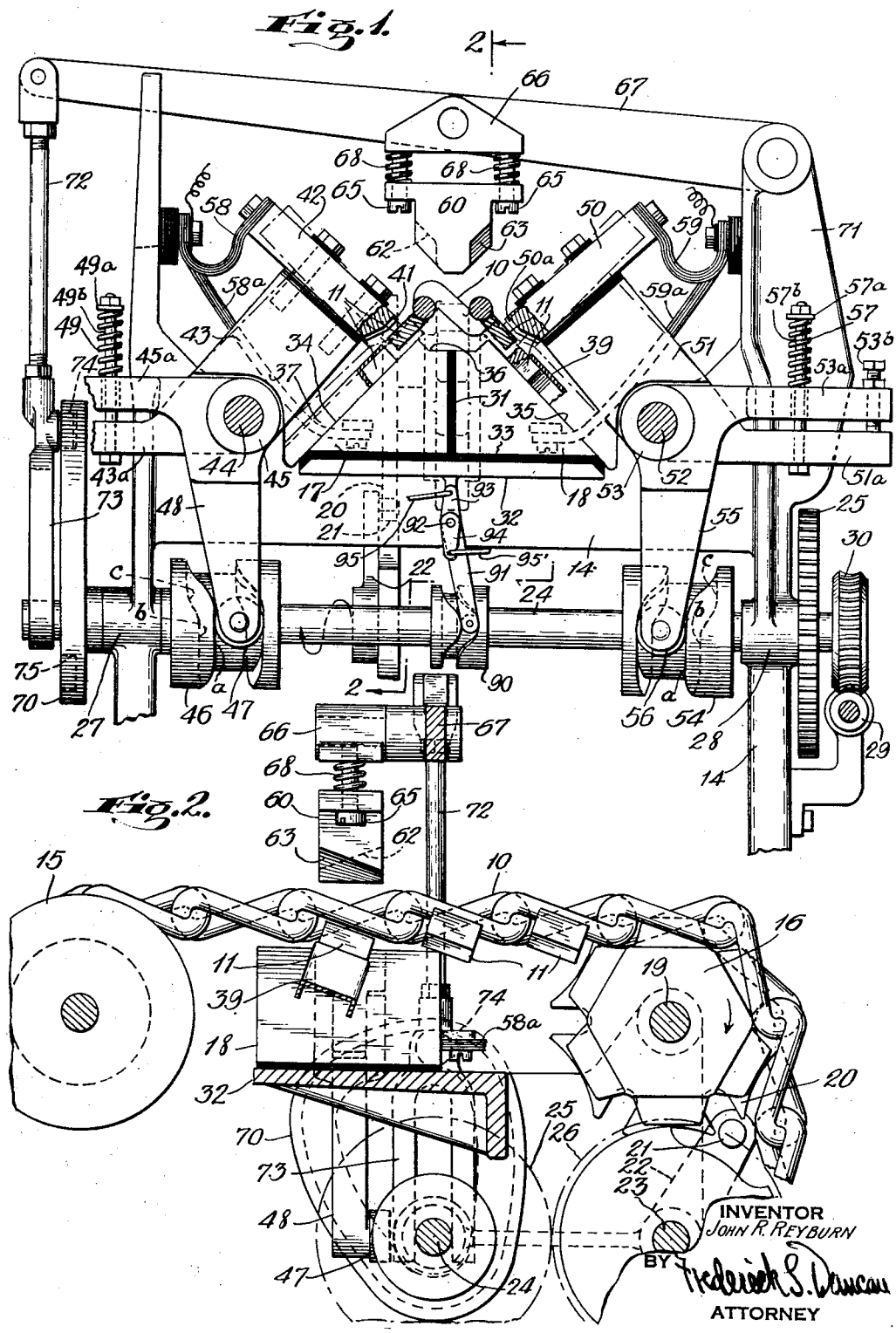

2,148,503

UNITED STATES PATENT OFFICE 2,148,503

ANTISKID CHAIN MAKING MACHINE

John R. Reyburn, Fairfield, Conn., assignor to American Chain & Cable Company, Inc., a corporation of New York Application December 1, 1936, Serial No. 113,537

8 Claims. (Cl. 219—4)

The present invention relates to a novel antiskid chain for vehicle wheels and means for making the same.

The primary object of the invention is to provide the tread links of a cross chain with slugs or caulks welded thereto in such a position that they flare downwardly and outwardly from the link, and project beyond the link proper both downwardly towards the road and outwardly towards the front and back. In applying either brakes or the engine power, there is always a tendency for cross chain links to roll as a result of road drag on the bottom of the link and wheel thrust in the opposite direction on the top of the link. This is particularly true in case of ordinary curb links which are not much wider than they are deep, actually in a ratio of about 1¼ to ½ and consequently offer little resistance to rolling until they twist to the limit allowed by their connections to the side chain.

The track of a pneumatic tired wheel equipped with the usual curb link cross chains, shows that as the wheel rolls over the chain there is only a slight lift of the tire tread off the road immediately adjacent the chain. The latter sinks into the rubber tread to such an extent that most of the load is supported by direct contact of the tire with the road. When a wheel is locked, traveling for instance on ice, the usual curb link tread chains roll on to their side. While slightly higher when lying on their side, the effective tire contact portion of the chain is narrower, the indent formed in the tire tread is narrower, the area of the indent is correspondingly less and the depth of this narrow indent develops more readily. As a result, in spite of the fact that the chain is slightly higher when on its side than when lying flat, the tire tread absorbs it in this position about as readily as when the chain is lying flat and the chain is driven into the ice with substantially no greater force when on its side than when lying flat.

The gripping force on ice which a chain can exert is dependent, other things being equal, on the force with which it is pressed into the ice. A high penetrating force can be secured by a large conventional chain. In fact it is possible to use a chain so large that each time it is run over by the tire, it will lift the wheel to such a degree that the tire will be raised out of contact with the road, and the entire weight of that corner of the car supported by said wheel will press the chain downwardly towards the road. This, however, results in excessive vibration, seriously injuring the car and disturbing the passengers.

My invention develops this full weight effect when braking or applying engine power, but in other stages of traveling, representing the big bulk of traveling, approximately only the usual degree of chain vibration is obtained, thereby conserving the automobile and avoiding excessive disturbance to the passengers. When braking or applying engine power and thereby causing partial rolling of the chain, one slug digs into the roadway as a pivot point while the opposite slug, swinging about this pivot point, pushes upwardly against the tire and develops a large area indent in the tire, actually tending to lift the wheel. The result is that the weight of the corner of the automobile carried by the wheel reaches the supporting road less directly through the tire tread to the road and more through the indented portion of the tread to the chain and then to the road. Furthermore, because of their outward flare, the slugs, even when in a partially rotated position, still extend substantially beyond the profile of the link proper and if properly contoured will dig into the roadway, exerting a more substantial grip than would the chain proper.

Another object of my invention is to provide means for welding the caulks to the cross chain.

A more specific object of my invention is to provide a welding machine adapted to weld two caulks simultaneously to the opposite strands of a curb link. Since the strands are oppositely inclined, I provide means for holding the caulks or slugs in corresponding inclined position while being welded.

In the preferred form of cross-chain, I employ caulks of elongated rectangular shape with their outer edges parallel to the link strands to which they are welded so that each caulk presents a sharp corner adapted to dig into ice and slippery pavements.

Other objects and advantages of my invention will appear in the following description of a preferred embodiment and a modification thereof and thereafter the novelty and scope of my invention will be set forth in the claims.

In the accompanying drawings:

Figure 1 shows my improved welding machine in vertical section, as viewed in the direction of feed of the chain to which the slugs are to be welded;

Fig. 2 is a fragmental view in longitudinal section taken on the line 2—2 of Fig. 1;

Fig. 3 is a view in side elevation of a curb link with the slugs welded thereon;

Fig. 4 is an end view of the same;

Fig. 5 is a plan view of the traction side of the link;

Fig. 6 is a fragmental view in transverse section of a modified form of machine for welding the slugs to the chain links; and Fig. 7 is a detail view of mechanism for feeding the slugs to welding position.

My improved cross-chain comprises a set of curb links 10 such as that shown in Figs. 3, 4 and 5. These links are preferably confined to the road engaging portion of the cross-chain. Each of said links has a pair of caulks 11 welded thereto. These caulks are preferably elongated rectangular bodies and are welded to the side strands of the link. As shown in Fig. 4 the caulks are flared outwardly so as to broaden considerably the road bearing width of the link. Since each caulk parallels the side strand of the link to which it is welded it presents a sharp corner 12 which serves as a prong to dig into the road.

A preferred machine for welding the caulks to the links is illustrated in Figs. 1 and 2. This machine comprises a main frame 14 on which is mounted a pair of sprocket wheels 15 and 16. A chain of curb links 10 is drawn over the wheel 15 by means of the sprocket wheel 16 so that the chain is stretched taut between these wheels. To this end any well known means (not shown) may be applied to the wheel 15, or to the chain itself to resist the pull of the sprocket wheel 16, so that the chain will normally be held clear of a pair of welding electrodes 17 and 18 disposed midway between the wheels 15 and 16. The wheel 16 is fixed upon a shaft 19 and also fixed on this shaft is a Geneva gear 20 adapted to be operatively engaged by a pin 21 on a drive arm 22 fixed to a shaft 23. The latter is geared to a main driving shaft 24 by a pair of gears 25 and 26. This driving shaft, as shown in Fig. 1, is suitably supported in bearings 27 and 28 carried by the main frame and is supplied with power through a worm and worm wheel 29 and 30, respectively.

The electrodes 17 and 18 are separated by a vertical plate 31 of insulation and are supported on a bracket 32 with a plate 33 of insulation material intervening therebetween. The outer side faces 34 and 35 of the electrodes are inclined and slope toward the longitudinal axis of the chain, forming an angle of about 45 degrees with the bracket 32. At their upper edges the electrodes are cut away to form a recess 36 for the purpose of clearance at the welding point. An inclined rectangular tubular guide 37 lies against the face 34 of the electrode 17 and through this guide, slugs 11 are fed to welding position. The inner wall of the guide 37 is cut away so that the slugs will rest directly upon the face of electrode 34. Any suitable means may be employed for intermittently feeding the slugs to the welding position. Such a means is shown in Fig. 7 and will be described hereinafter. A similar tubular guide 39 lies against the face 35 of the electrode 18 and through this another set of slugs 11 is fed. It will be understood that the slugs in the guide 37 are to be welded to the adjacent side strands of the curb links 10 and the slugs fed through tube 39 are to be welded to the other side strands of the links. Since the strands of the link are oppositely inclined the guides are also correspondingly inclined, as shown in Fig. 2, so that each slug when fed to welding position will present an edge parallel to the side strand to which it is to be welded.

The guide tubes 37 and 39 stop short of the upper end of the electrodes 17 and 18 so that the slugs pass out of the tubes as they come successively to welding position. However, they are still held against lateral displacement and also against over feeding due to momentum when operated at high speed, by another pair of electrodes, as will now be explained. Before the outermost slug clears tube 37 it enters a recess 41 formed in an electrode 42 and is thereby prevented from lateral displacement. Also, the electrode 42 is adapted to exert a slight resilient pressure on the slug as it moves up to the welding position. Thereafter the pressure is greatly increased to clamp the slug tightly against electrode 17 during the actual welding step. Thus, it will be seen that the slug is always under control while it is being fed to the welding position and up to the time when it is actually welded to the chain link. The friction provided by the preliminary slight pressure of electrode 42 prevents the slug from being overfed by inertia. The electrode 42 is bolted to but insulated from a lever 43 pivoted on a fixed stud 44. A bell crank lever 45 is also pivoted on the stud 44. A drum cam 46 fixed upon the shaft 24 is provided with a cam groove engaged by a roller 47 pivoted on a depending arm 48 of the bell crank 45. The other arm 45a of the bell crank overlies a substantially horizontal arm 43a of the electrode lever 43. A compression spring 49 bears at one end upon the arm 45a and at its opposite end against a washer 49a adjustable on the bolt 49b carried by the arm 43a. The spring, therefore, urges the two arms together and this movement is limited by a set screw 49c (see Fig. 6) carried by the arm 45a and bearing against the arm 43a. It will thus be apparent that as the cam 46 swings the bell crank lever 45 the electrode 42 will be correspondingly moved, but the motion will be positive in one direction only, namely, away from electrode 17.

In a similar manner the slugs which are fed along the sloping face 35 of electrode 18 are always kept under control from the moment they enter the guide 39 up to the time when they are actually welded to the link. An electrode 50 is provided with a recess 50a into which the slug is forced as it comes up to welding position. Electrode 50 is mounted on a bell crank lever 51 pivoted on a stud 52. Also, pivoted on this stud is a bell crank lever 53 having a depending arm 55 bearing a roller 56 that rides in a groove formed in a drum cam 54 fixed to the shaft 24. The other arm 53a of the bell crank 53 overlies a substantially horizontal arm 51a of the bell crank 51. A spring 57 bears at one end against a washer 57a adjustable on a bolt 57b carried by the arm 51a, and the opposite end of the spring bears against the arm 53a. A set screw 53b screwed through the arm 53a bears against the arm 51a to limit the relative movement of the arms under pressure of spring 57.

The grooves in cams 46 and 54, which are engaged by the rollers 47 and 56, respectively, are each provided with three steps a, b and c. In Fig. 1, the parts are shown in the position they occupy after a weld has been completed. The rollers 47 and 56 ride on the steps a of the cams, in which position they positively withdraw the electrodes 42 and 50 clear of the welded slugs. Just before the next slugs are fed to welding position the rollers will engage the steps b of the cams and electrodes 42 and 50 will be forced inwardly toward the fixed electrodes 17 and 18, respectively, but they will be spaced therefrom by an amount slightly less than the thickness of the slugs 11. Thus, when the slugs are fed up to welding position they must force the electrodes 42 and 50 outwardly to a slight extent against the pressure of springs 49, 57. When the welds are to be made the rollers 47 and 56 ride on the steps c and the bell cranks 42 and 50 are swung to such an extent as to exert through the springs 49 and 57 a heavy pressure on the slugs, sufficient to clamp the slugs tightly against the fixed electrodes 17 and 18 and establish good electrical contact between each slug and the electrodes engaging the same.

It will be noted, of course, that the recesses or grooves 41 and 50a are disposed at the proper inclination so that they will be respectively alined with the guide tubes 37 and 39. Welding current is supplied to the electrodes 42 and 17 through leads 58 and 58a which may be connected to one pole of a source of welding current, while the other pole is connected through leads 59 and 59a to the electrodes 50 and 18, respectively.

As explained above, the chain to which the caulks are to be welded normally lies just above the welding point. When a weld is to be made the chain is depressed by a block 60 which is automatically lowered in predetermined time relation to the operation of the rest of the mechanism. This block 60 is formed of good conducting material and constitutes a neutral electrode in that it is not itself directly connected to a source of electric energy, but merely serves in conjunction with the two ends of the link to pass current from one strand to the other of the link when the welds are made. The block 60 is of such shape that it will enter between the strands of the link and it is formed with oppositely inclined shoulders 62 and 63 arranged to provide parallel bearings on the opposite side strands of the link.

Since the slugs 11 may not be of absolutely uniform dimensions, it is possible that the slugs at the welding point will not always occupy the same positions and the link may be canted to one side or the other when pressed against these slugs. To allow for such canting and also to allow for any variations in height or depth of the link, the block 60 is provided with a floating support. As clearly shown in Fig. 1, the block has sliding engagement with a pair of bolts 65 which depend from opposite ends of a lever 66 pivoted on an operating arm 67. Springs 68 are interposed between the lever 66 and the block 60 so that when the block is forced downwardly by the lever 67 the springs will permit it to yield and hence will limit the pressure that it can apply to force the side strands of the link into contact with the slugs 11. Also, if the link is canted in one direction or the other the block 60 may swing on the axis of lever 66 to accommodate itself to the position of the link.

The lever 67 is raised and lowered by means of a cam 70 fixed to the shaft 24. The arm 67 is pivoted at one end to a bracket 71 rising from the main frame, and pivoted to the opposite end of the arm 67 is a rod 72 which at its lower end carries a fork 73 that straddles the adjacent end of the shaft 24. A roller 74 on this fork engages a groove 75 in the cam 70.

The operation of the machine is as follows: By means of the Geneva drive the sprocket wheel 16 is intermittently rotated to bring successive links 10 to a position just above the welding point. At the same time slugs 11 are fed upwardly to welding position between electrodes 42 and 17 on one hand, and, electrodes 50 and 18, on the other. When in welding position these slugs are spaced from the link 10 to which they are to be welded. The position of the links when ready for a weld is shown in broken lines in Fig. 1 and in full lines in Fig. 6. As explained above, during the feed of the slugs the rollers 47 and 56 are riding on the steps b of the cams 46 and 54 so that the slugs will be held with a slight resilient pressure against the sloping faces of the electrodes 17 and 18. In this position, the slugs are also supported by the feeding means so that they cannot be depressed longitudinally. During the welding step the rollers 47 and 56 ride on the surfaces c of the cams and a full pressure of springs 49 and 57 is then exerted to clamp the slugs between electrodes 42 and 17 on the one hand, and, 50 and 18 on the other. At the same time the cam 70 is operated to force the block 60 downwardly, depressing the chain and tightly clamping the side strands of the link 10 against the ends of the slugs 11. Welding current is now supplied to the electrodes. Electrodes 17 and 42 are connected to one pole and the electrodes 18 and 50 to the other pole of a source of welding current and a flow is thus established from one pair of electrodes to the other through the slugs, the side strands of the link, the ends of the link, and the intervening neutral electrode 60, thereby welding the slugs to their respective side strands. It will be noted that the current passes serially through the two weld joints. As soon as the welds have been completed steps a of cams 46 and 54 operate to oscillate the electrodes 42 and 50 to the position shown in full lines in Fig. 1, so that they will stand clear of the slugs 11 which are now welded to the link. At the same time cam 70 raises the neutral electrode 60 permitting the chain to rise with the slugs attached thereto, thereby clearing the electrodes 17 and 18. Then the Geneva motion operates to withdraw the welded link and bring a new link into welding position.

If desired, the welding current may be passed in parallel through the two weld joints. In such case the two electrodes 17 and 18 are replaced with a single electrode 80, as shown in Fig. 6, and the electrodes 42 and 50 are connected to the same pole of the welding current source as is the electrode 80. However, instead of a neutral electrode 60 I provide an active electrode 81 of similar shape to electrode 60, but this electrode is connected by a flexible lead 82 to the opposite pole of the source of welding current, so that the current flow takes place through each joint into or out of the electrode 81. In other respects, the machine may be the same as that shown in Figs. 1 and 2.

The means, shown in Fig. 7, for intermittently feeding the slugs, comprises a pair of plungers 85 and 86, one for each tubular guide 37 and 39. That portion of each plunger which enters the tubular guide is preferably formed of insulation material particularly when two fixed electrodes 17 and 18 of opposite polarity are used. There is a magazine 87 disposed at right angles to each tubular guide and in communication with the guide at the lower end thereof. Each magazine is preferably insulated from the body of the machine by a plate 88 of insulation material. Slugs slide out of the magazines into the guides when the plungers are withdrawn and are forced upwardly in the guides upon the advance stroke of the plungers. A spring 89 on each guide bears against the lowermost slug to keep the column of slugs from dropping during retraction of the plungers. The plungers are operated in timed relation to the rest of the mechanism by a cam 90 on shaft 24 which is arranged to oscillate an arm 91 fixed to a shaft 92. Also fixed to shaft 92 are two arms 93 and 94, respectively. Arm 93 is connected by a rod 95 to one of a pair of toggle links 96 and 97. The link 96, at its outer end, is pivoted to a fixed stud 98 on the frame 10, and the outer end of link 97 is pivoted to the plunger 85. Similarly, arm 94 is connected by a rod 95' to one of a pair of toggle links 99 and 100 which are pivoted to a fixed stud 101 and the plunger 86, respectively.

In operation, as the cam 90 swings the arm 91 clockwise, the plungers 85 and 86 will be advanced, raising the column of slugs in each tubular guide. In this position the columns of slugs will be held by springs 89 when the plungers are retracted by a reverse swing of arm 91. However, the plungers will remain in raised position until the welds are made so as to assist in taking the thrust of electrode 60 or 81 as the case may be. In other words, I do not depend solely upon the clamping friction of the oscillating and fixed electrodes to hold the slugs in welding position. As soon as the plungers are retracted to the position shown in Fig. 7, a slug will drop out of each magazine into the adjacent guide tube in position to be advanced up the tube upon the next forward movement of the plunger.

It will be obvious that the flare of the slugs welded to the chain is controlled by the angle between faces 34 and 35 and by using electrodes of different relative angularity the flare may be increased or diminished at will even to the point of bringing the slugs into parallel with each other.

While I have described a preferred embodiment of my invention and a modification thereof it will be understood that these are to be taken as illustrative and not limitative and that I reserve the right to make various changes in form, construction and arrangement of parts without departing from the spirit and scope of my invention as set forth in the following claims.

I claim:

1. A machine for welding caulks to the links of a chain, said machine comprising a wedge-shaped support, means for intermittently feeding the chain lengthwise of the support so as to bring successive links to a welding position directly above the support with a strand of the link over each sloping face of the support, a tubular guide resting on each sloping face of the support, means for intermittently feeding caulks up each guide to bring successive caulks to welding position on each face of the support immediately below the link, a pair of movable electrodes, means for operating said electrodes to clamp the caulks when in welding position against the support, a vertically movable electrode, means for depressing the latter electrode to clamp the link in welding position against the caulks, and driving mechanism for operating all of said means in mutually timed relation.

2. A machine for welding caulks to a chain of curb links, said machine comprising a wedge-shaped support, means for intermittently feeding the chain lengthwise of the support so as to bring successive links to a welding position directly above the support with a strand of the link over each sloping face of the support, a tubular guide resting on each sloping face of the support, each guide being tilted so as to lie normal to the adjacent side strand of the link, means for intermittently feeding caulks up each guide to bring successive caulks to welding position on each face of the support immediately below the link, a pair of movable electrodes, means for operating said electrodes to clamp the caulks when in welding position against the support, a vertically movable electrode, means for depressing the latter electrode to clamp the link in welding position against the caulks, and driving mechanism for operating all of said means in mutually timed relation.

3. A machine for welding a pair of slugs simultaneously to opposite strands of a chain link, said machine comprising a tubular guide for each slug extending in a direction normal to the strand to which the slug is to be welded, means for feeding each slug through the guide to a welding position, the sides and outer face of each guide being cut away at the welding position, a recessed clamping member adapted to form a continuation of each guide at the welding point, resilient means adapted to press the clamping members against the outer faces of the lugs as they are being fed to prevent overfeeding by inertia, means for increasing the resilient pressure on the clamping members to clamp the slugs after they have reached the welding position, an auxiliary clamping member operable to clamp the link against the slugs with the latter engaging the side strands of the link respectively, means for operating the auxiliary clamping member, means for passing welding current through the joints between the slugs and link to cause simultaneous welding of the slugs to the link, and means for withdrawing the clamping members from the link and slugs after the welds have been made.

4. A machine for welding a caulk to a chain link, said machine comprising a tubular guide for the caulk, means for feeding the caulk through the guide to a welding position, the guide being cut away at least in part at the welding position, a clamping member adapted to form a continuation of the guide at the welding point, means for exerting pressure on the clamping member to clamp the caulk against the inner face of the guide when the caulk has reached the welding position, another clamping member adapted to clamp the link against the caulk, and means for passing welding current through the joint between the caulk and link to weld the caulk to the link.

5. A machine for welding a caulk to a chain link, said machine comprising a tubular guide for the caulk, means for feeding the caulk through the guide to a welding position, the guide being cut away at least in part at the welding position, a clamping member adapted to form a continuation of the guide at the welding point, resilient means adapted to press the clamping member against the outer face of the caulk as it is being fed so as to prevent overfeeding by inertia, means for increasing the resilient pressure on the clamping member to clamp the caulk against the inner face of the guide when the caulk has reached the welding position, another clamping member adapted to clamp the link against the caulk, and means for passing welding current through the joint between the caulk and link to weld the caulk to the link.

6. A machine for welding a pair of caulks simultaneously to opposite sides of a chain link, said machine comprising mechanism for feeding the caulks to a welding position, means for guiding the caulks as they are fed, said means being adapted to prevent displacement of the caulks in any direction other than that in which they are fed, opposed electrodes at the welding position forming part of said guiding means, mechanism for causing relative movement of said electrodes to clamp the caulks therebetween, an auxiliary electrode operable to press the link into welding position with each side strand thereof engaging a caulk, means for operating the auxiliary electrode in timed relation to said clamping mechanism, means for passing a welding current through the electrodes to cause simultaneous welding of the caulks to the link, and means for withdrawing the electrodes from the link and caulks after the welds have been made.

7. A machine for welding a pair of caulks simultaneously to opposite sides of a chain link, said machine comprising mechanism for feeding the caulks to a welding position and holding said caulks in said position during a welding operation, means for guiding the caulks as they are fed, said means being adapted to prevent displacement of the caulks in any direction other than that in which they are fed, electrodes at the welding position forming part of said guiding means, mechanism for causing relative movement of said electrodes to clamp the caulks therebetween, an auxiliary electrode operable to press the link into welding position with each side strand thereof engaging a caulk, means for operating the auxiliary electrode in timed relation to said clamping mechanism, means for passing a welding current through the electrodes to cause simultaneous welding of the caulks to the link, and means for withdrawing the electrodes from the link and caulks after the welds have been made.

8. A machine for welding a pair of caulks simultaneously to opposite strands of a curb link, said machine comprising mechanism for feeding the caulks to a welding position, means for guiding each caulk in a direction normal to the link strand to which it is to be welded, said means being adapted to prevent displacement of each caulk in any direction other than that in which it is moved by the feeding mechanism, electrodes at the welding position forming part of said guiding means, mechanism for causing relative movement of said electrodes to clamp the caulks therebetween, an auxiliary electrode operable to press the link into welding position with each side strand thereof engaging a caulk, means for operating the auxiliary electrode in timed relation to said clamping mechanism, means for passing a welding current through the electrodes to cause simultaneous welding of the caulks to the link, and means for withdrawing the electrodes from the link and caulks after the welds have been made.

JOHN R. REYBURN.